M. ZEPEDA.
TYPE BAR BEARING.
APPLICATION FILED JUNE 22, 1910.
971,653.
Patented Oct. 4, 1910.
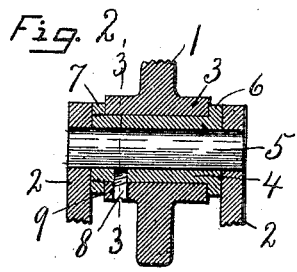
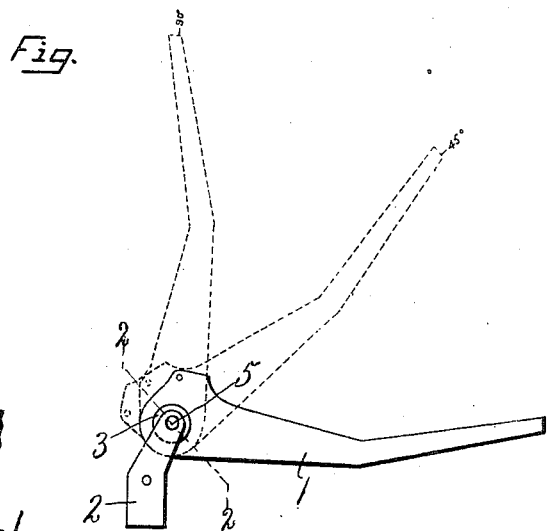
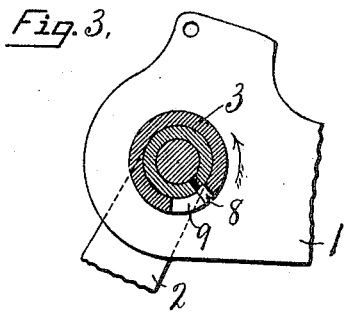
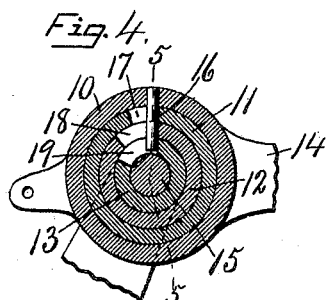
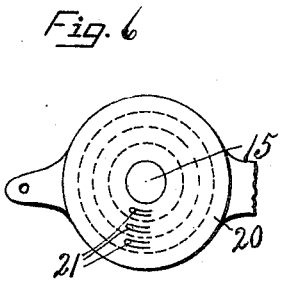
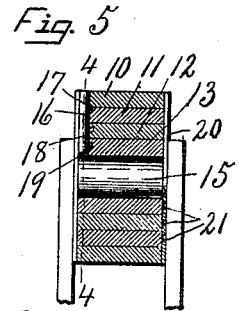
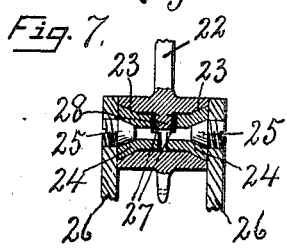
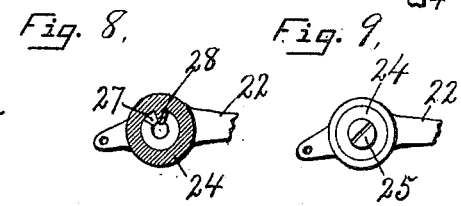
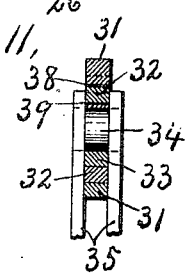
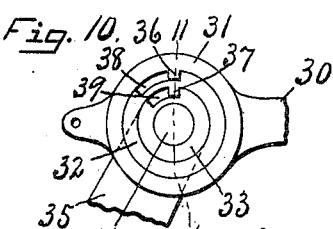
WITNESSES:
R. W. Bailey.
H. E. Chase
INVENTOR:
M. Zepeda
BY Howard P. Denison
ATTORNEY.
THE NORRIS PETERS CO., WASHINGTON, D. C.

UNITED STATES PATENT OFFICE.

MIGUEL ZEPEDA, OF SYRACUSE, NEW YORK.

TYPE-BAR BEARING.

971,653.  Specification of Letters Patent.  Patented Oct. 4, 1910.

Application filed June 22, 1910. Serial No. 568,332.

*To all whom it may concern:*

Be it known that I, MIGUEL ZEPEDA, of Syracuse, in the county of Onondaga, in the State of New York, have invented new and useful Improvements in Type-Bar Bearings, of which the following, taken in connection with the accompanying drawings, is a full, clear, and exact description.

This invention relates to certain improvements in type-bar bearings for typewriting and similar machines employing a system of levers having their types or striking points located some distance from their axes of movement, and adapted to strike at the same point in the same straight line.

One of the essential requirements in this class of machines is that the bearings for the type-bars must be so adjusted as to prevent lost motion and at the same time to allow a free action of the type-bar under its own gravity and momentum.

In most of the machines now in common use, each type-bar travels through an arc of approximately 90° and the wear on each bearing surface is continuous throughout the length of such arc, so that even though the bearing may be initially adjusted to meet every requirement for freedom of movement and perfect alinement, it soon becomes worn to such an extent as to allow lost motion, thereby causing imperfect alinement of the printing. My object therefore is to maintain this alinement for a longer period of time than has heretofore been practicable, irrespective of the axial or radial length of the bearing, by the use of a plurality of coaxial bearing members acting in sequence through a portion only of the arc of movement of the type-bar, thereby distributing the wear to a plurality of bearing surfaces rather than to a single surface as is commonly practiced.

Other objects and uses relating to specific parts of the bearing will be brought out in the following description.

In the drawings: Figure 1 is a side elevation of a type-bar and one form of my improved bearing. Figs. 2 and 3 are enlarged sectional views taken respectively on line 2—2, Fig. 1, and 3—3, Fig. 2, except that the full circumferential length of the bearing is shown in Fig. 3. Figs. 4 and 5 are, respectively, a transverse section and a longitudinal section (enlarged) of a modified form of my invention showing a greater number of bearing members. Fig. 6 is a face view of the friction ring shown at one end of the bearing, Fig. 5. Figs. 7 and 8 are, respectively, a longitudinal section and a transverse section, somewhat enlarged, of a still further modified form of bearing including means for taking up the wear. Fig. 9 is an end view of the bearing shown in Figs. 7 and 8, omitting the hanger arms. Fig. 10 is an end view of another modified form of my invention. Fig. 11 is a sectional view taken on line 11—11, Fig. 10.

In Figs. 1, 2 and 3 is shown a type-bar —1— pivotally connected by one form of my improved bearing to a suitable hanger —2—, the latter adapted to be inserted in the segment of a typewriting machine for holding the type-bar in proper position. This bearing consists in this instance of a hub or collar —3— and an inner sleeve —4— which is mounted on a pivotal pin —5—, the latter being secured to the hanger —2—. The hub or collar —3— is rigidly secured to and may form an integral part of the type-bar —1— and is coaxial and concentric with the sleeve —4— and pivotal pin —5—.

As best seen in Figs. 2 and 3, the hub or collar —3— is closely fitted upon the periphery of the sleeve —4— between suitable shoulders or end flanges —6— and —7—, so as to rotate freely under the gravity and momentum of the bar —1—, one of said shoulders, as —7—, being adjustable to take up wear. The sleeve —4— is provided with a radially projecting stud or shoulder —8— projecting through a circumferentially elongated slot —9— in the hub or collar —3—, the length of the slot being approximately equal to one-half of the arc of movement of the type-bar.

When the type-bar is in its normal position of rest, the end of the slot in the direction of rotation of the bar from its normal position is engaged with the stud or shoulder —8— which is of considerably less diameter than the length of the slot, thereby leaving the bar free to rotate upon the sleeve —4— through practically one-half of the arc of movement of said bar before the other end of the slot engages the stud, whereupon such engagement will cause the rotation of the sleeve —4— through the remaining portion of the arc of movement of the type-bar. The hub or collar —3— and sleeve —4— are, therefore, moved in sequence each through practically one-half of the arc of movement of the type-bar, the hub of the type-bar being first moved upon the sleeve —4— from its normal position, shown by full lines in Fig. 1, to an angle of about 45°, as shown by dotted lines in the same figure, and then during the continued movement of the bar to the 90° position, also shown by dotted lines, the sleeve —4— is rotated upon the pivotal pin —5—. It is now clear that when the type-bar reaches its printing position, the end of the slot toward the direction of return movement of said bar is in engagement with the stud —8—, thus leaving the type-bar and its hub —3— free to re-bound or return through practically one-half its arc of movement upon the sleeve —4—, at which time the opposite end of the slot engages the stud and rotates said sleeve through the remaining portion of the return movement of the bar ready for a repetition of the operation previously described.

In Figs. 4, 5 and 6 is shown a plurality of, in this instance four, concentric cylindrical sleeves —10—, —11—, —12— and —13— journaled one upon the other, the outer sleeve being secured to a type-bar —14—, while the inner sleeve is journaled upon a pivotal pin —15—. A stud or pin —16— is secured to the outer sleeve —10— and projects inwardly and radially through circumferentially elongated slots or recesses —17—, —18— and —19— formed respectively in the sleeves —11—, —12— and —13— and gradually increasing in circumferential length inwardly, that is, the lengths of the slots respectively approximate one-fourth, one-half and three-fourths of the arc of movement of the type-bar and when the type-bar is at rest, the ends of the slots opposite the direction of forward movement of the bar, are normally engaged with the stud or pin —16—, so that as the type-bar is moved from its normal position toward its printing position, the pin —16— will successively engage the advance ends of the slots —17—, —18— and —19— and thereby successively move the bearing members —11—, —12— and —13—. In other words, the type-bar which is secured to the outer sleeve —10—, will move freely upon the member —11— through practically one-fourth of its arc of movement and will then engage to operate the next sleeve —11— about one-fourth turn upon the sleeve —12— during the succeeding quarter movement of the type-bar, the sleeve —12— being similarly moved during the next quarter, while the inner sleeve —13— will be moved during the last quarter of the arc of movement of the type-bar. It is now apparent that when the type-bar is moved to the printing position, the stud —16— is in engagement with the advance ends of the slots —17—, —18— and —19—, so that on the return movement the outer sleeve —10— with the type-bar thereon will be free to return on the re-bound upon the sleeve —11— and during its return movement will successively rotate the sleeves —11—, —12— and —13—, one upon the other to their starting positions.

When several bearing members are rotatingly mounted one upon the other, as shown in Figs. 4, 5 and 6, it may be advisable to provide means for slightly retarding the action of the innermost sleeves to cause the bearing members to move in sequence as described, and for this purpose I have provided a thin spring metal washer —20— at one end of the bearing members, said washer being formed with spring tongues —21— adapted to frictionally engage the adjacent ends of the bearing members —11—, —12— and —13—. This friction, however, is very light and insufficient to prevent the free action of such bearing members under the gravity and momentum of the type-bar.

In Figs. 7, 8 and 9, I have shown a type-bar —22— as provided with cone bearings —23— adapted to receive similar cone shape bearing sleeves —24—, the latter being engaged by adjustable cone bearings —25— to take-up wear. The cone bearings —25— preferably consist of threaded studs screwed into opposite sides of a hanger —26— and the adjustment of either one of these bearings —25— serves to take up wear at both ends. The cone sleeves —24— which are on opposite ends of the hub of the type-bar terminate longitudinally short of the center of the hub to allow take-up and are provided with recesses —27— for receiving a stud or shoulder —28— projecting inwardly from the inner side of the hub of the type-bar, the circumferential length of the slot being somewhat longer than that of the stud or shoulder —28—, so as to allow a limited movement of practically 45° of the type-bar upon the cone sleeves, whereupon the further movement of the type-bar through the remaining arc of 45° causes the shoulder —28— to engage the end of the slot or recess —27—, thereby rotating the cone sleeves. It is evident that when the type-bar assumes its printing position, the shoulder —28— will be in engagement with the advance end of the slot, so as to allow the type-bar to rebound freely upon the cone sleeve —28—, and then to return such cone sleeves to their starting positions as the type-bar assumes its normal position of rest.

In Figs. 10 and 11, is shown a type-bar —30— having its hub —31— comparatively narrow transversely and journaled upon an inner ring —32— which in turn is journaled upon a smaller ring —33—, the latter being journaled upon a pivotal pin —34— on the hanger —35—. The hub —31— of the type-bar —30— and ring —32— are provided with radial shoulders —36— and —37— projecting inwardly and radially into circumferentially elongated slots —38— and —39—. The length of each slot is substantially equal to one-third of the arc of movement of the type-bar, so that as the type-bar moves from its normal position of rest toward the printing position, its hub —31— will rotate freely upon the ring —32— through substantially one-third of its arc of movement until its shoulder —36— engages the advance end of the slot —38—, thereby moving the ring —32— through one-third of such arc, or until the shoulder —37— engages the advance end of the slot —39—, at which time the inner sleeve —33— will be carried forwardly through the remaining portion of the arc of 90° of movement of the type-bar. When the type-bar reaches its printing position, the shoulders —36— and —37— are engaged respectively with the advance ends of their slots or recesses —38— and —39—, thus permitting the type-bar —30— and rings —32— and —33— to return in sequence to their starting positions.

What I claim is:

1. A type-bar bearing comprising a plurality of rotary bearing members one of which is secured to the type-bar, and means brought into action by the movement of the type-bar for rotating said members in sequence.

2. A type-bar bearing comprising a plurality of coaxial rotary bearing members one of which is secured to the type-bar, and means actuated by the type-bar for rotating said members in sequence both on the forward and return movement of the type-bar.

3. A type-bar bearing comprising concentric members relatively rotatable in sequence, and means for effecting such sequential action.

4. A type-bar bearing comprising concentric members relatively rotatable in sequence, and means for effecting such sequential action during both the printing stroke and the return stroke of the type-bar.

5. A type-bar bearing comprising a plurality of coaxial members rotatable one upon the other, one of said members being secured to the type-bar, and means actuated by the type-bar for causing said members to move in sequence both on the printing stroke and return stroke.

6. A type-bar bearing comprising coaxial members rotatable one upon the other, one of the members being secured to the type-bar, and connections between said members for causing them to move in sequence.

In witness whereof I have hereunto set my hand on this 18th day of June, 1910.

MIGUEL ZEPEDA.

Witnesses:
H. E. CHASE,
H. L. HUMPHREY.